United States Patent
Øvergaard

(10) Patent No.: US 7,525,914 B2
(45) Date of Patent: Apr. 28, 2009

(54) METHOD FOR DOWN-SPEEDING IN AN IP COMMUNICATION NETWORK

(75) Inventor: Tarjei Øvergaard, Nesoddtangen (NO)

(73) Assignee: Tandberg Telecom AS, Lysaker (NO)

( * ) Notice: Subject to any disclaimer, the term of this patent is extended or adjusted under 35 U.S.C. 154(b) by 494 days.

(21) Appl. No.: 11/452,106

(22) Filed: Jun. 13, 2006

(65) Prior Publication Data
US 2007/0025251 A1    Feb. 1, 2007

(30) Foreign Application Priority Data
Jun. 15, 2005    (NO) ................................. 20052929

(51) Int. Cl.
H04L 12/16 (2006.01)
G06F 11/00 (2006.01)
G06F 15/16 (2006.01)

(52) U.S. Cl. .................. 370/232; 370/238.1; 370/260; 348/E7.083; 709/234; 375/E7.016

(58) Field of Classification Search ...... 370/229–238.1, 370/260–265, 335–338; 348/E7.07, E7.083, 348/E7.063; 709/231–234; 375/E7.016; 714/57, 704, 708, 776, 799
See application file for complete search history.

(56) References Cited

U.S. PATENT DOCUMENTS 7,062,568 B1 *   6/2006   Senevirathne et al. ....... 709/234
7,315,967 B2 *   1/2008   Azenko et al. .............. 714/704
2002/0004841 A1   1/2002   Ryusuke
2002/0147834 A1   10/2002   Shih-ping et al.
2005/0039103 A1   2/2005   Yehuda et al.

OTHER PUBLICATIONS

Floyd, S., Handley, M., Padhye, J., and Widmer, J., "Equation-Based Congestion Control for Unicast Applications," *SIGCOMM 2000*, pp. 1-14, (May 2000).
Handley, M., et al., "RFC 3448—TCP Friendly Rate Control (TFRC): Protocol Specification," http://rfc.net/rfc3448.txt, (Jan. 2003).

* cited by examiner

*Primary Examiner*—Afsar M. Qureshi
(74) *Attorney, Agent, or Firm*—Oblon, Spivak, McClelland, Maier & Neustadt, P.C.

(57) ABSTRACT

The present invention discloses a method for providing a packet loss detection and down speeding mechanism for maintaining acceptable quality during a video call. Different scenarios of packet loss requiring different down speeding degrees are accommodated by a two-parted method combined by a low-part and a high-part decision and down speeding mechanisms. The method has a consecutively measured packet loss as input, and uses weighted packet loss parameter of recently measured packet loss to decide whether to down speed, and if so, whether the low-part or high-part down speeding mechanism should be used.

8 Claims, 1 Drawing Sheet

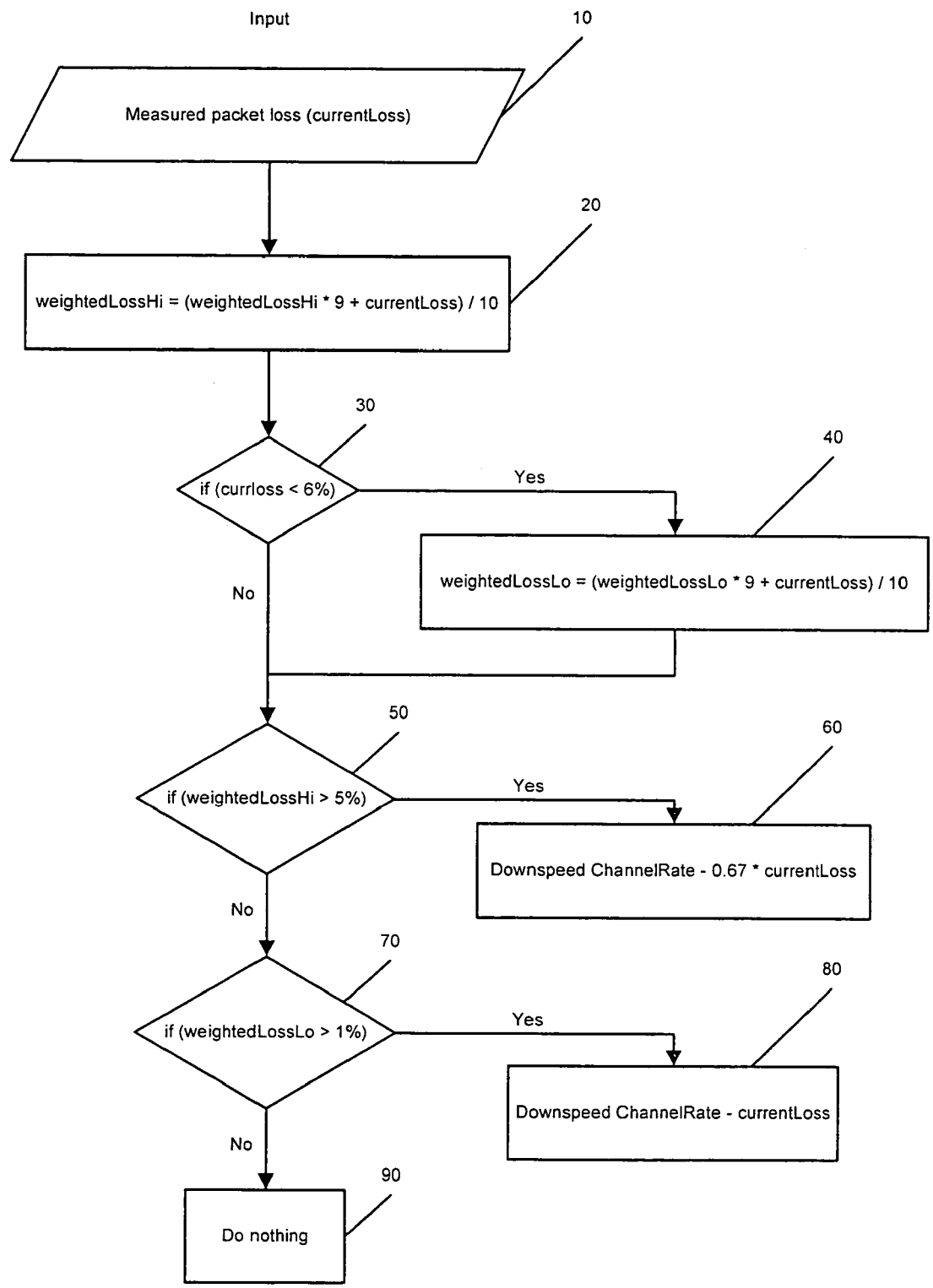
Figure

METHOD FOR DOWN-SPEEDING IN AN IP COMMUNICATION NETWORK

RELATED APPLICATION

This application claims priority under 35 U.S.C. § 119 or 365 to Norwegian Application No. 20052929, filed Jun. 15, 2005. The entire teachings of the above application are incorporated herein by reference.

BACKGROUND

H.323 is an umbrella recommendation from the International Telecommunications Union (ITU) that set standards for multimedia communications over packet switched network that do not provide a guaranteed Quality of Service. Such networks are pervasive on many corporate terminals and include TCP/IP and IPX over Ethernet, Fast Ethernet and Token Ring network technologies. The H.323 standard, titled: Packet-Based Multimedia Communications Systems, provides a foundation for audio, video, and data communications across IP-based networks, including the Internet. Multimedia products and applications complying with the H.323 standard are interoperable, can communicate with each other, and thus are compatible. Many sub standards make up the H.323 standard or protocol, one of which is the H.245 standard. The term real-time multimedia communication used herein is addressed to communication according to this standard, but the present invention can also be used in relation with other similar standards and protocols, e.g. the SIP (Session Initiated Protocol) standard.

Transmitting data by a packet-switched network is one of the most common methods of transmitting data. As with any other type of data transmission, data transmitted by a packet-switched network can be affected by transmission errors such as loss of packets. Real-time multimedia communication is particularly exposed to packet loss because there is usually no time for error correction communication between the parties as can be done in other types of data transmission. A packet loss of only a few percentages will e.g. occur as annoying disturbance and interruptions on the video display of the receiver.

Besides, due to the video coding characteristics of e.g. H.323 multimedia communication, loss of some packets in a data flow can significantly affect the rest of the data flow. For example, consider the situation where the transmitted data is digital video encoded by a prediction based compression technique. In that case, loss of packets will affect not only a particular frame to which the data in the lost packets belong, but also subsequent frames. In addition, if the compression technique uses motion compensation, then the lost packets will affect not only a particular region in the frames, but also surrounding regions in the subsequent frames, the extent of which depends on the value of the motion vectors. Similarly, if the transmitted data is digital video encoded using variable length coding (for example, Huffman coding), the packet loss can render the information contained in one or more of the subsequent packets unusable. Various techniques have been developed to minimize, and even correct for, the effects of packet loss on transmitted video data. One set of techniques attempt to reduce the effect of packet loss by including redundant control data in all packets. For example, some packetization protocols require control data necessary for decoding a packet to be included in a packet's header, even though the same information is included in a preceding packet.

Another set of techniques attempt to reduce the effects of lost data on the video image by replacing the lost data with other data. For example, according to one such technique, the lost data is replaced with data from a preceding frame, thereby attempting to improve the image quality of the current frame and reduce errors in subsequently decoded frames. Yet another set of techniques provide methodologies for allowing a receiving terminal to determine whether a packet has been lost and, if so, send a request for a correction of the lost data to the transmitting terminal. The transmitting terminal then provides data, which corrects the effects of the lost data.

The attempt to reduce the effects of packet loss mentioned above is only useful in situations of marginal or momentary packet loss. In many cases, packet loss occurs e.g. when the terminals try to communicate with a higher bit rate than the assigned transmission pipe allows. As an example, when a user requests a call on 768 kbps on a 768 kbps communication link, the link will not be able to transfer as much media data as requested, due to signalling and overhead. The difference between requested and actual media data throughput will occur as packet loss implying annoying disturbance on the user's video display.

According to prior art, the problems of packet loss occurring when data of too high bit rate relative to the capacity of the communication pipe is transmitted are solved by so-called down speeding. Down speeding means stepwise data rate reduction, of which data is transmitted from the multimedia terminals during a call.

According to the H.245 standard, which defines the control protocol part of the H.323 standard, there are several ways of altering the flow rate during a call. One way is to send a flowControlCommand to the transmitting terminal. The flowControlCommand includes the fields logicalChannelNumber and maximumBitRate. The maximumBitRate parameter then indicates the maximum allowed bit rate for the logical channel, to which the transmission data rate is reduced.

SUMMARY

The present invention relates to packet loss in real-time multi-media communication.

The features defined in the independent claims enclosed characterize this method.

In particular, the present invention discloses a method of adjusting a flow rate of data transmitted from a first conference device and received at a second conference device wherein a current packet loss consecutively is being measured in the data received at a second conference terminal, including calculating a new value for a first parameter by adding a weighted first fraction of a last value of the first parameter and a weighted second fraction of the current packet loss, wherein the first fraction is higher than the second fraction, if the current packet loss is lower than a predefined first threshold, then calculating a new value for a second parameter by adding a weighted fraction of a last value of the second parameter and a weighted fraction of the current packet loss, wherein the last value is weighted higher than the current packet loss, if the first parameter is higher than a predefined second threshold, then reducing the flow rate of data transmitted from the first conference device with a third fraction of the amount of the current packet loss, and if the second parameter is higher than a predefined third threshold, then reducing the flow rate of data transmitted from the first conference device with a fourth fraction of the current packet loss.

BRIEF DESCRIPTION OF THE DRAWINGS

In order to make the invention more readily understandable, the discussion that follows will refer to the accompanying drawing, The FIGURE is a flow sheet illustrating a preferred embodiment of the present invention.

DETAILED DESCRIPTION

In the following, the present invention will be discussed by describing a preferred embodiment, and by referring to the accompanying drawing. However, people skilled in the art will realize other applications and modifications within the scope of the invention as defined in the enclosed claims.

The present invention provides a packet loss detection and down speeding mechanism for maintaining acceptable quality during a video call.

Packet loss based down speeding is intended to give the user better quality on a video call. The basic thought is that loss-free low bit rate calls are better than lossy high bit rate calls. This is why down speeding is implemented at all. For the purpose of describing the present invention, three typical scenarios of substantial packet loss that may occur will be described.

In a first scenario, consider a video conference endpoint configured to make a call on 768 kbps, using a link with max outgoing capacity of 256 kbps, which is a quite common bit rate for ADSL. In this scenario massive packet loss will occur. As the endpoint is configured to transmit data at a rate of 768 kbps, and the available communication pipe is only 256 kbps, a packet loss up to 60% will occur. To be able to address this, an aggressive and fast down speeding mechanism which will bring video channel rate quickly down to about 180 kbps will be needed.

In a second scenario, the endpoint is still configured to transmit a 768 kbps call, but in this case on a 768 kbps link. This seems to be a reasonable thought—however, the link is restricted to 768 kbps total bandwidth, while a configuration of a video conference endpoint at 768 kbps means transmission of 768 kbps pure media. In fact, transmission of additional bits for i.a. signalling and packet overhead is required. Thus, the media transmission pipe is narrower than the indicated bit rate resulting in a packet loss in the area 1-5%, which for a user would appear as quite annoying.

In a third scenario, consider an endpoint making a call on a high-capacity LAN network. In this case, there is on average sufficient bandwidth available for transmission on high data rates. However, on a shared LAN, short bursts of packet loss may typically occur due to other connections occasionally occupying a large part of the capacity, when e.g. downloading large files from the Internet over the LAN. Here, down speeding will not be successful, because short overloads in shared LANs will normally occur from time to time, exposing connected terminals for peaks of packet loss even if their transmission data rates are small. Initiations of down speeding as a result of short bursts of packet loss will therefore unnecessarily degrade the video quality.

The present invention provides a down speeding and a decision process that is adjusted to all three scenarios discussed above.

In the present invention, different scenarios of packet loss and requiring different down speeding degrees are accommodated by a two-part method combined by a low-part and a high-part decision and down speeding mechanisms. The method has a consecutively measured packet loss as input, and uses weighted packet loss parameter of recently measured packet loss to decide whether to down speed, and if so, whether the low-part or high-part down speeding mechanism should be used.

In a preferred embodiment of the invention, two weighted packet loss parameters are used. The first one (weightedLossHi) associated with the high-part down speeding mechanism, and a second one (weightedLossLo) associated with the low-part down speeding mechanism.

Both the high- and low-part of our mechanisms are designed as damped integrators, and are weighted combinations of last calculated weightedLoss and current packet loss, wherein last calculated weightedLoss is higher weighted than the current packet loss. In one example, 90% is contributed from the stored weighted loss, and 10% from the currently measured loss. The result is stored back into weighted loss parameter for use in the next iteration. This can be formulated as follows:

$$\text{weighted\_loss} = (\text{weighted\_loss} * 9 + \text{current\_loss})/10$$

As will become apparent in the further description, the effect of this is a removal/flattening of any loss-spikes (add only 10% of measured loss), and at the same time historic data will gradually fade (keep only 90% for each loss-measurement interval), so the most recent loss measurements are regarded the most important.

The present invention will be further described referring to the FIGURE depicting a preferred embodiment of the present invention. The FIGURE is a flow chart illustrating one iteration of the preferred embodiment. As can be seen here, the high-part parameter weightedLossHi is calculated for each measuring sample 10 of the packet loss at 20. The low-part parameter weightedLossLo is calculated at 40 only if the current measured loss is lower than a predefined threshold, which in the FIGURE is 6% at 30.

Then, a test 50 is performed investigating whether current weightedLossHi is above predefined high-part threshold, which in this case is 5%. If so, the high-part down speeding process is initiated 60. If not, yet another test 70 is preformed, investigating whether current weightedLossLo is above predefined low-part threshold, which in this case is 1%. If so, the low-part down speeding process is initiated 80. If not, the iteration is terminated 90, and a new packet loss measure and the corresponding iteration are initiated.

In the case of high-part down speeding, it is already stated that the packet loss is relatively high. Experience has shown that a proper approach is to reduce the channel rate with a fraction of the current loss rounded down to the nearest 4 kbps. In the example illustrated, the high-part down speeding process reduces the channel rate with 67/100 of the current loss, i.e.:

$$\text{New\_channel\_rate} = \text{Old\_channel\_rate} - 0.67 * \text{Current\_Loss}$$

In the case of low-part down speeding, when the current packet loss is lower, a proper approach is to reduce the channel rate with the current loss rounded down to the nearest 4 kbps, i.e.:

$$\text{New\_channel\_rate} = \text{Old\_channel\_rate} - \text{Current\_Loss}$$

Alternatively, the channel rate can be reduced by a fraction of the current loss, as in the case of high-part down speeding.

One result of the down speeding method according to the present invention is that periodic packet loss rarely will result in down speeding. The loss must be at least 50% over a 5 second interval to cause inappropriate down speeding. Despite this, the present invention provides an aggressive down speeding mechanism which is adjusted to bring the video channel rate quickly down. Additionally, a "light" down speeding is provided in the case of sustained relatively small, but annoying packet loss.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of adjusting a flow rate of data transmitted from a first conference device and received at a second conference device wherein a current packet loss consecutively is being measured in the data received at a second conference terminal, the method comprising:
    calculating a new value for a first parameter by adding a weighted first fraction of a last value of the first parameter and a weighted second fraction of the current packet loss, wherein the first fraction is higher than said second fraction,
    if the current packet loss is lower than a predefined first threshold, then
        calculating a new value for a second parameter by adding a weighted fraction of a last value of said second parameter and a weighted fraction of the current packet loss, wherein the last value is weighted higher than the current packet loss,
    if the first parameter is higher than a predefined second threshold, then
        reducing the flow rate of data transmitted from the first conference device with a third fraction of the amount of the current packet loss,
    if the second parameter is higher than a predefined third threshold, then
        reducing the flow rate of data transmitted from the first conference device with a fourth fraction of the current packet loss.

2. A method according to claim 1, wherein the first and the second conference devices are video conference endpoints.

3. A method according to claim 1, wherein the first fraction is 0.9 and the second fraction is 0.1.

4. A method according to claim 1, wherein the first threshold is 6%.

5. A method according to claim 1, wherein the second threshold is 5%.

6. A method according to claim 1, wherein the third threshold is 1%.

7. A method according to claim 1, wherein the third fraction is 0.67.

8. A method according to claim 1, wherein the fourth fraction is 0.1.

* * * * *